United States Patent [19]

Taylor, Jr.

[11] 4,309,769

[45] Jan. 5, 1982

[54] METHOD AND APPARATUS FOR PROCESSING SPREAD SPECTRUM SIGNALS

[75] Inventor: Taliaferro H. Taylor, Jr., Melbourne, Fla.

[73] Assignee: Harris Corporation, Melbourne, Fla.

[21] Appl. No.: 124,261

[22] Filed: Feb. 25, 1980

[51] Int. Cl.³ .................. H01Q 3/26; H04K 1/04; H02L 27/30
[52] U.S. Cl. .................. 375/1; 343/100 SA; 343/100 CL; 343/100 LE; 455/276
[58] Field of Search .................. 343/100 SA, 100 LE, 343/100 CL, 854; 375/1; 455/276, 278

[56] References Cited

U.S. PATENT DOCUMENTS

| | | | |
|---|---|---|---|
| 3,460,145 | 8/1969 | Johnson | 343/100 SA |
| 3,500,303 | 3/1970 | Johnson | 340/6 |
| 3,665,316 | 5/1972 | Jeffers | 455/6 |
| 3,714,573 | 1/1973 | Grossman | 455/26 |
| 3,776,559 | 10/1973 | Butcher, Jr. et al. | 343/100 SA |
| 3,803,613 | 4/1974 | Wright | 343/113 R |
| 3,864,635 | 2/1975 | Ewanus | 455/260 |
| 3,987,444 | 10/1976 | Masak | 343/100 LE |
| 4,017,798 | 4/1977 | Gordy et al. | 375/1 |
| 4,041,391 | 8/1977 | Deerkoski | 375/1 |
| 4,079,380 | 3/1978 | Esry et al. | 343/100 LE |
| 4,079,381 | 3/1978 | Piesinger | 343/100 CL |
| 4,085,368 | 4/1978 | Yeh | 455/139 |
| 4,152,702 | 5/1979 | Piesinger | 343/100 LE |
| 4,156,877 | 5/1979 | Piesinger | 343/854 |
| 4,213,131 | 7/1980 | Kaiser, Jr. | 343/854 |
| 4,217,586 | 8/1980 | McGuffin | 343/100 CL |

Primary Examiner—Benedict V. Safourek
Attorney, Agent, or Firm—Craig and Antonelli

[57] ABSTRACT

In order to avoid the need for individual RF down-converters in each channel of a spread spectrum adaptive array receiver, means are provided for frequency offsetting the received spread spectrum signals in each antenna array element from spread spectrum signals in the other array elements. The frequency offset signals are summed to form a broadband composite signal of spread spectrum signals separated from one another by the frequency offsets. After summing, the spread spectrum signals in the composite broadband signal are despread to form a narrowband composite signal having narrowband signals separated by the frequency offset. Since the resulting composite despread signal has a relatively narrow bandwidth, it can be passed through a single common receiver. Accordingly, the input to an adaptive array processor from the receiver is a low frequency relatively narrow signal. This significantly reduces the tracking requirements of the adaptive array processor and allows for significant reduction in costs, weight and size of the adaptive array processor in addition to the elimination of unnecessary RF down-converters.

32 Claims, 9 Drawing Figures

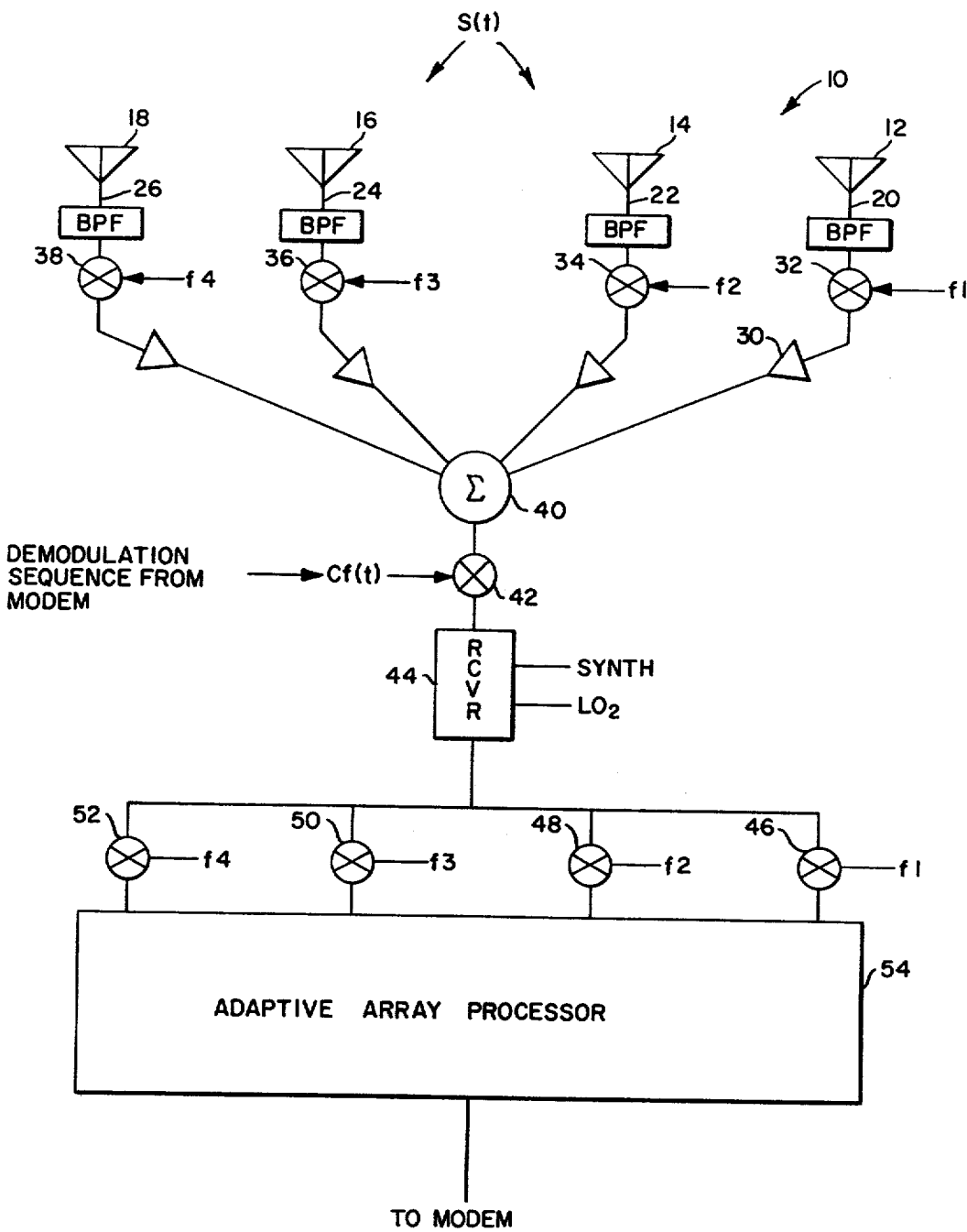

SIGNAL AT ANTENNA ELEMENT

AFTER MULTIPLICATION BY $f_1$

AFTER MULTIPLICATION BY $Cf(t)$

FREQUENCY TRANSLATE THROUGH RECEIVER

MULTIPLY BY $f_1$

AFTER FILTERING BY AAP

METHOD AND APPARATUS FOR PROCESSING SPREAD SPECTRUM SIGNALS

FIELD OF THE INVENTION

This invention relates generally to spread spectrum systems, and, more particularly, to an apparatus and method for despreading a received spread spectrum signal by an antenna array to allow the frequency multiplexed passage of N channels through a common receiver.

BACKGROUND OF THE INVENTION

In recent years there has been growing use of spread spectrum systems due to the many advantages attainable by the use of such systems. One of the most desirable advantages is the ability of spread spectrum systems to operate well in the presence of interference, whether the interference is intentional or not. Therefore, spread spectrum systems are very attractive in situations where anti-jamming transmission and reception is desired.

One of the most common spread spectrum systems, especially for anti-jamming use, is the PN (pseudo-noise) sequence modulating type system. With the PN sequence system, a PN code is used in combination with digital information to modulate a carrier for transmission. Typically, some form of PSK (phase shift keying) is used for this modulation, although, of course, other modulation schemes could be used. The result of modulating a carrier with the PN code and the information is a broadband spread spectrum signal. This spread spectrum signal forces any jamming arrangement not using the same PN code to cover a wide frequency range at a much higher power level than the spread spectrum signal itself if interference is to be achieved.

When the spread spectrum signal is received, the same PN code is used to despread the signal. Once the PN code is removed, the information can readily be detected. However, to any other receiving system not knowing the PN code, the spread spectrum signal will appear essentially to be incomprehensible noise.

In prior art antenna array receivers for spread spectrum signals, the despreading is typically accomplished in the demodulator. As a result of this, each channel of the array requires an individual RF down-converter to convert the signal to a new frequency suitable for processing in the adaptive array processor (AAP) prior to passing to the modem. Use of a common receiver for down-conversion is not practical due to the precise phase and amplitude tracking required between signals over the extremely large bandwidth that would be necessary to frequency multiplex such broadband signals through a common receiver.

Therefore, the prior approach of utilizing down-converters in each channel accentuates one of the major problems of spread spectrum systems—namely complexity and high costs due to the large amount of hardware. Also, phase and amplitude tracking errors caused in these multiple down-converters combine with similar phase and amplitude tracking errors in the adaptive array processor to produce serious degradation of the null depth of the array system.

SUMMARY OF THE INVENTION

It is, therefore, an object of the present invention to provide an improved receiving apparatus and method for spread spectrum signals.

Another object of the present invention is to provide a simple and effective despreading arrangement.

Yet another object of the present invention is to provide a despreading arrangement allowing for practical frequency multiplexing of multiple channel spread spectrum signals through a common receiver within reasonable receiver bandwidth limitations.

To achieve these and other objects of the present invention, a spread spectrum apparatus and method is provided for receiving spread spectrum signals with an antenna array, including an arrangement for frequency offsetting the spread spectrum signals in each array element. The frequency offset signals are then summed to form a broadband composite signal of spread spectrum signals separated from one another by the frequency offsets. The spread spectrum signals of the broadband composite signal are then despread to form a narrowband composite signal having narrowband signals separated by the frequency offsets. The despread signals in the narrowband composite signal can then be passed through a common receiver for down-conversion and passage to an adaptive array processor.

BRIEF DESCRIPTION OF THE DRAWINGS

Other objects and advantages of the present invention may be more clearly understood by reference to the following detailed description and drawings wherein:

FIG. 1 is a block diagram showing the basic arrangement of the present invention;

DETAILED DESCRIPTION

Figure 2A:
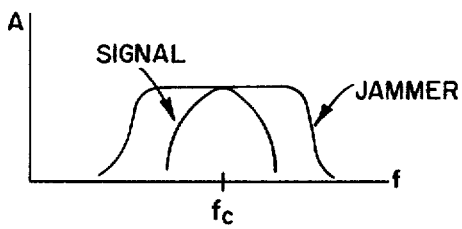
FIGS. 2A through 2F are waveform diagrams showing the waveforms at various points in FIG. 1.

Referring now to the drawings, FIG. 1 shows the basic structure of the present invention having an antenna array 10 for receiving a spread spectrum signal in antenna elements 12, 14, 16 and 18. Each array element defines a separate channel, 20, 22, 24 and 26, respectively, in which the spread spectrum signal is received. Each of these channels includes a bandpass filter 28 to operate as a conventional preselection filter, and an amplifier 30 to preserve the noise figure of the system. The bandpass filter 28 and the amplifier 30 are of conventional design, and their construction does not form part of the present invention. FIG. 2A shows a typical spread spectrum signal and a jammer signal as they appear at an antenna element spaced around a center carrier frequency $f_c$.

Figure 2B:
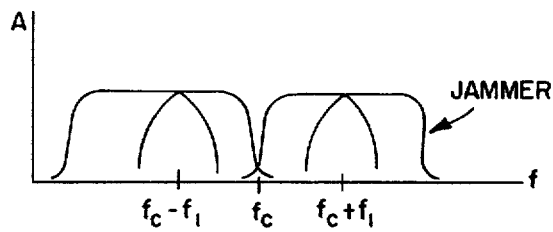

Between the bandpass filter 28 and the amplifier 30 the channels include mixers 32, 34, 36, and 38 respectively. These mixers serve to mix the spread spectrum signals in channels 20, 22, 24 and 26 with frequencies $f_1$, $f_2$, $f_3$, and $f_4$ respectively. Preferably, these frequencies $f_1$ through $f_4$ will be low frequency signals (for example 2, 3, 4 and 5 MHz respectively). Inasmuch as frequencies $f_1$ through $f_4$ are different from one another, this arrangement allows for a frequency offset between the spread spectrum signals in each of the respective channels. FIG. 2B shows the results of multiplying the received spread spectrum signal $f_1$ in channel 20 for example. As can be seen, this forms a pair of signals around new center frequencies $f_c - f_1$ and $f_c + f_1$, respectively. A similar signal arrangement can be found in each of the other channels although, of course, the center frequencies of the pairs of signals will be different owing to the differences in the frequencies $f_1$ through $f_4$.

The respective frequency offset spread spectrum signals from the channels 20 through 26 are then combined in a summer 40 to form a broadband composite signal of the four spectrum signals separated by frequency offsets introduced by the frequencies $f_1$ through $f_4$.

Following the summing of the spread spectrum signals in the summer 40 to form the broadband composite signal, the broadband composite signal is passed to a despreading mixer 42. The despreading mixer 42 is also coupled to a despreading sequence $C_f(t)$ from the modem. Typically, if a PN sequence code technique is utilized, the despread signal will be the same PN code which was used to generate the spread spectrum signal in the transmitter. As shown in FIG. 1, in the present case this PN code is a fast code $C_f(t)$ relative to a slow code which will be discussed hereinafter.

Figure 2C:
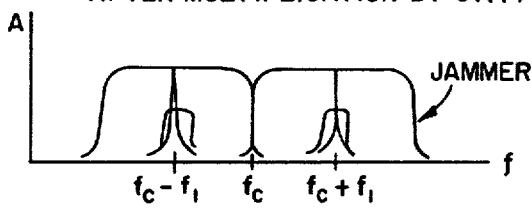

By introducing the despreading sequence in the despreading mixer 42 for combination with the summed output of the individual spread spectrum channel signals, the PN code is stripped off so that each of the spread spectrum signal channels are converted to a narrowband signal as shown in FIG. 2C. The jammer signal, however, is not converted to a narrowband signal since it is not based on the PN code. Therefore, the output of the despread mixer is a composite frequency multiplex signal having despread narrowband signals separated by the frequency offsets introduced by the mixers 32 through 38.

Figure 2D:
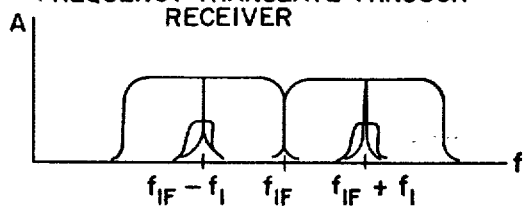

One of the principal advantages of the present system is that the composite narrowband signals total bandwidth is sufficiently narrow to allow passage of the entire frequency multiplex composite signal through a common receiver 44. This receiver 44 provides the necessary down-conversion for further processing. FIG. 2D shows the frequency translation of the despread signal from channel 20, for example. And, inasmuch as only one receiver is necessary, this avoids the requirement of a separate down-converter for each channel of the array. This can also result in less degradation of the null depth of the array system due to the avoidance of phase and amplitude tracking errors brought about by the reduction of the number of down-converters.

Figure 2E:
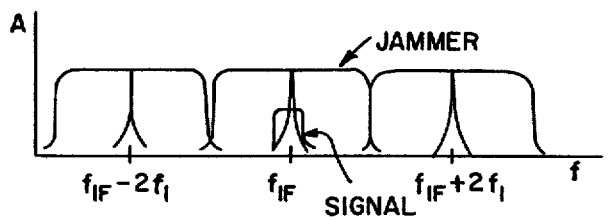
Figure 2F:
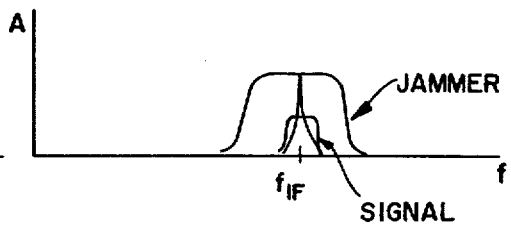

After passing through the common receiver 44, the frequency offset is removed from the down-converted signal by mixers 46, 48, 50 and 52 and an adaptive array processor 54. These mixers 46 through 52 combine the down-converted signal with frequency signals $f_1$, $f_2$, $f_3$, and $f_4$, respectively, to produce sets of signals in each channel such as shown in FIG. 2E with a center component having no frequency offset components $f_1$, and an upper and lower component each including a $2f_1$ frequency component. Following mixing, the signals are passed to an adaptive array processor wherein filtering removes the upper and lower frequency offset components leaving only a processed center component centered around $f_{IF}$, as shown in FIG. 2F.

Utilizing this approach to despreading, the tracking specifications for the down-converter and the adaptive array processor do not need to be as tight as those required by prior art systems. The reason for this is that these components can be operated in a narrowband rather than across a broadband region. For example, in despreading a OSQPSK (offset quadrature phase shift keying) signal modulated from PSK data on a command uplink, typically a bandwidth compression can be made from 10 MHz to 100 kHz. Therefore, tracking by the RF hardware is only required over 100 kHz rather than 10 MHz. Tracking at this lower frequency bandwidth is substantially easier.

Another advantage of utilizing the above arrangement for despreading prior to down-conversion is that the adaptive array processor can be made by monolithic integrated circuit techniques (or hybrid techniques) due to the low frequency and bandwidth requirements. This, in turn, allows reduction in weight, size, and cost of the adaptive array processor. It is noted that the IF frequency of operation from the receiver to the adaptive array processor can be in the area of 500 kHz to 1 MHz, if desired. Of course, other IF frequencies could also be used, and the invention is not intended to be limited to any particular IF frequencies or any particular bandwidths.

Figure 3:
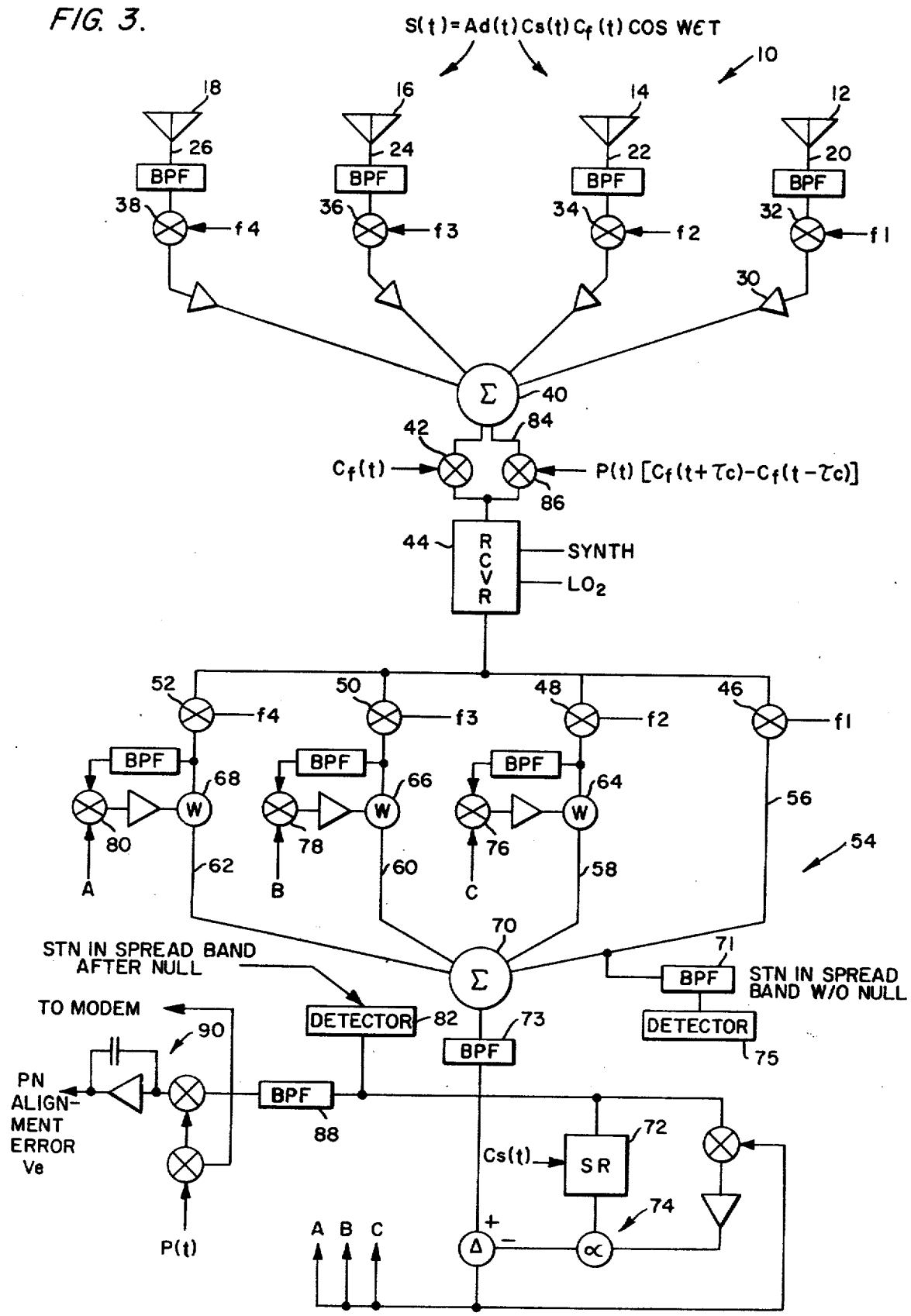
FIG. 3 is a block diagram showing further details of the present invention.

FIG. 3 is a more detailed illustration of the present invention, including arrangements for beam steering and for synchronization of the PN code between the spread spectrum transmitter and the spread spectrum receiver. Those elements in FIG. 3 which are identical to FIG. 1 are also identically numbered.

In order to provide for beam steering, a separate slow code $C_s(t)$ combined with the spread spectrum signal is transmitted. Thus, the signal received at elements 12, 14, 16 and 18 is:

$$s(t) = Ad(t)C_s(t)C_f(t) \cos \omega_c t$$

where:
  d(t) is the data,
  $C_s(t)$ is a slow code PN sequence,
  $C_f(t)$ is a fast code PN sequence, and
  $\cos \omega_c t$ is the spectrum center frequency.

This slow code $C_s(t)$ is an a-priori coding of the PSK sequence which is used for signal recognition in order to allow beam steering. Normally the fast PN code sequence $C_f(t)$ would be used for signal recognition for beam steering. However, since the fast PN code $C_f(t)$ is stripped prior to signal recognition in the adaptive array processor, it is necessary to add an additional coding such as the slow code $C_s(t)$. This slow code should be at least twice the data rate to allow for adequate signal recognition. Thus, as an example, using a 50 Kbit data rate, the slow code rate should be at least 100 kHz. The fast code rate is generally much higher, for example, in the area of 30 MHz.

In the adaptive array processor 54 channels 56, 58, 60 and 62 are formed to couple to mixers 46, 48, 50 and 52, respectively. Weights 64, 66 and 68 are respectively provided in the adaptive array processor channels 58, 60 and 62. The setting of these weights 64, 66 and 68 functions to allow for beam steering of the array. After weighting, the signal in the adaptive array processor channels 56 through 62 are summed in a summer 70. To provide an indication of the signal and noise in the spread band without the null which beam steering achieves, a bandpass filter 71 is provided in the unweighted channel 56 leading to a detector 75.

To allow for setting the weights 64, 66 and 68, the output of the summer is coupled to a signal recognizer 72 through a bandpass filter 73. The bandwidth of the bandpass filter is set to strip off the upper and lower frequency components of the summer output (e.g. see FIGS. 2E and 2F).

The signal recognizer 72 is provided with the slow code $C_s(t)$ to allow matching that code with the identical slow code in the received signals. The signal recognizer 72 forms part of an $\alpha$ loop 74 which operates on the recognized signal to set the weight values A, B and C which are coupled to weights 64, 66 and 68 through the mixers 76, 78 and 80 respectively. The weighting loops themselves are conventional, each one containing a bandpass filter and an amplifier as shown in FIG. 3. An $\alpha$ loop arrangement utilizing a signal recognizer as shown in FIG. 3 is discussed in detail in copending application Ser. No. 965,778 filed by G. Patrick Martin, and assigned to the same assignee as the present application. This patent application is incorporated herein by reference. Of course, other weight generating arrangements utilizing conventional signal recognizers could be used if desired. A detector 82 is also coupled to the output of the summer 70 through the bandpass filters 73 to indicate the signal and noise in the spread band after the null brought about by steering the beam utilizing the $\alpha$ loop 74.

In order for the system to operate, it is, of course, necessary to synchronize the PN code through an alignment technique. In conventional systems using a fast code $C_f(t)$ for signal recognition for beam steering, the PN tracking is achieved by comparing the pilot level as a result of despreading at times ½ chip early and ½ chip late. When the pilot level is equal for both despread signals, the PN is assumed to be on time.

In the present invention where the fast code $C_f(t)$ is stripped early, the PN alignment technique is achieved by providing an auxiliary channel 84 with a mixer 86 parallel to the despreading mixer 42. A PN tracking sequence $$P(t) = [C_f(t + \tau_c) - C_f(t - \tau_c)]$$
$$= \pm \text{ one full chip}$$

where

P(t) is a perturbation sequence, and $\tau_c$ is chip time is also an input to this mixer 86. Thus, the signal in the auxiliary channel 84 is the difference between a one chip advance and one chip late fast sequence, multiplied by the perturbation function P(t). Note that this P(t) function can be one of the Welsh functions.

By providing the auxiliary channel 84, the input to the receiver 44 is two composite narrowband signals separated by twice the multiplex frequency of the frequency offset signal. All components in the receiver 44 must track precisely over both of these composite narrowband frequencies.

After the receiver output is passed through the adaptive array processor 54, the adaptive array processor output will be the spread jammer residue and three despread signal terms. The amplitude of each of these three signal terms is proportional to the received signal correlated with the advanced, retarded, and principal sequence. By setting the bandwidth of the bandpass filter 88 at the output of the adaptive array processor to the signal bandwidth, and multiplying the adaptive array output by P(t) in a PN tracking demodulator 90, the perturbation sequence is removed from the advanced-retarded correlation term. Multiplication of the band limited adaptive array processor output with the advanced-retarded sequence results in a correlation of the main path correlation with respect to the auxiliary path correlation. The correlation products at the output of the PN tracking demodulator 90 may then be used to provide the PN tracking information. It should be noted that when the PN sequence is aligned, there is no correlation with the $\pm \tau_c$ sequences. There is then no perturbation to the main path signal when the sequences are aligned. The actual output of the PN tracking demodulator 90 will be equal to $$Ve = 2A^2_{sw} E[q^2(t)](1 + \delta/\tau_c)(-\delta/\tau_c)$$

where

Ve is the error voltage, $\delta$ is the misalignment time, $\tau_c$ is chip time, $A_{sw}$ is the sum of wave voltages in the AAP channels, and $E[q^2(t)]$ is the expected value of $q^2(t)$ where q(t) is the product of Cf(t) and Cs(t)

Figure 4:
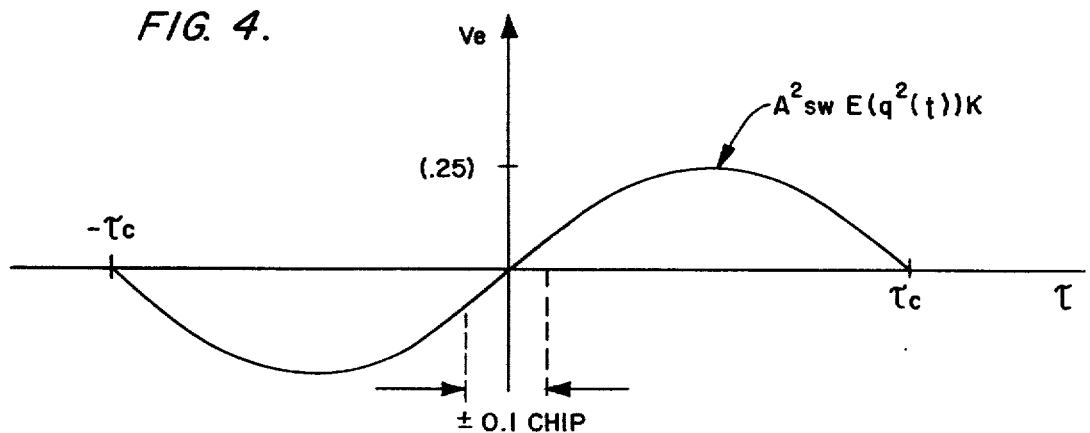
FIG. 4 is a waveform diagram showing the plot of the PN alignment error voltage using the alignment apparatus shown in FIG. 3.

FIG. 4 shows a plot of the PN alignment error voltage over a time between one chip advanced and one chip retarded.

Although the present invention is described for use with a PN sequence, it is to be recognized that the same approach to despreading could be used with a chirp system. This would be done by substituting the dechirp C(t) rather than the PN sequence for $C_f(t)$ in the despreading mixer 42.

Although particular arrangements for PN alignment and beam steering have been shown in FIG. 3, it is, of course, to be recognized that other approaches to these functions could be used without departing from the scope of the present invention. Similarly, other approaches could be used to provide the necessary frequency offset or the weighting as alternatives to the particular arrangements shown in FIGS. 1 and 3. And, of course, the invention could be applied to a variety of array arrangements, and is not intended to be limited to a four-element antenna array as shown herein merely by way of example.

It is to be understood, therefore, that the above-described arrangements are simply illustrative of the application of the principles of this invention. Numerous other arrangements may be readily devised by those skilled in the art which embody the principles of the invention and fall within its spirit and scope.

I claim:

1. A spread spectrum receiving system comprising:

an antenna array having a plurality of elements for receiving a spread spectrum signal;

means for frequency offsetting the spread spectrum signal in each array element from spread spectrum signals in the other array elements;

means for summing the frequency offset signals to form a broadband composite signal of spread spectrum signals separated from one another by the frequency offsets; and means for despreading the spread spectrum signals of the broadband composite signal to form a first narrowband composite signal having narrowband signals separated by the frequency offset.

2. A system as in claim 1, further comprising a common receiver coupled to the output of the despreading means for down-converting the frequency of the narrowband signals in the narrowband composite signal.

3. A system as in claim 1, wherein the despreading means comprises a mixer having a first input coupled to the output of the summing means and a second input for receiving a despreading signal.

4. A system as in claim 3, wherein the spread spectrum signal includes a PN sequence code, and the despreading signal utilizes this PN sequence code to produce the narrowband signals.

5. A system as in claim 4, wherein the PN sequence code is a fast code sequence $C_f(t)$.

6. A system as in claim 1, wherein the frequency offsetting means comprises a plurality of mixers $MO_1 \ldots MO_n$, one of said mixers being coupled to each array element, wherein each of said mixers $MO_1 \ldots MO_n$ is also coupled to a frequency signal $F_1 \ldots F_n$, respectively.

7. A system as in claim 2, further comprising means coupled to the output of the receiver for removing the frequency offset.

8. A system as in claim 7, wherein the removing means includes a plurality of mixers $MR_1 \ldots MR_n$ coupled in parallel to the output of the receiver, wherein each of said mixers is also coupled to a frequency signal $F_1 \ldots F_n$, respectively.

9. A system as in claim 7 or 8, further comprising an adaptive array processor coupled to the mixers $MR_1 \ldots MR_n$ including removing the frequency offset components of the first narrowband composite signal.

10. A system as in claim 2, wherein the spread spectrum signal includes a PN fast code signal $C_f(t)$, and said receiving system further includes means for error tracking the PN fast code alignment.

11. A system as in claim 10, wherein the error tracking means includes an auxiliary channel coupled in parallel to the despreading means between the summing means and the common receiver, said auxiliary channel including means for multiplying the spread spectrum signals in the composite broadband signal by a despreading error function to produce a second composite narrowband signal for error tracking the PN fast code.

12. A system as in claim 11, wherein the despreading error function is:

$$p(t)[C_f(t+\tau_c) - C_f(t-\tau_c)]$$

where $p(t)$ is a perturbational sequence and $\tau_c$ is the chip time.

13. A system as in claim 11 or 12, wherein the error tracking means further includes a PN tracking demodulator coupled to the receiver output to generate a misalignment PN error signal based on the despreading error function.

14. A system as in claim 1, wherein the spread spectrum signals includes a PN slow coding sequence $C_s(t)$ for beam steering.

15. A system as in claim 14, wherein the PN slow coding sequence has a frequency of at least twice the frequency of a data rate of the spread spectrum signals.

16. A system as in claim 9, wherein the adaptive array processor includes a signal recognizer for detecting a slow coding sequence contained in the spread spectrum signals and means for adjusting the adaptive array processor for beam steering in accordance with the output of the signal recognizer.

17. A system as in claim 1, wherein the spread spectrum signal includes a chirp signal, and the despreading means includes a dechirp signal.

18. A method comprising:
receiving a spread spectrum signal in an antenna array having a plurality of elements to produce spread spectrum signals respectively in the elements;
frequency offsetting the spread spectrum signals in each array element from spread spectrum signals in the other array elements;
summing the frequency offset signals to form a broadband composite signal of spread spectrum signals separated from one another by the frequency offsets; and
despreading the spread spectrum signals of the broadband composite signal to form a first narrowband composite signal having narrowband signals separated by the frequency offset.

19. A method as in claim 18, further comprising down-converting the frequency of the narrowband signals in the narrowband composite signal in a receiver after despreading.

20. A method as in claim 18, wherein the despreading step comprises mixing the spread spectrum signals in the composite broadband signal with a local oscillator signal modulated by a despreading signal.

21. A method as in claim 20, wherein the spread spectrum signal includes a PN sequence code, and the despreading signal utilizes this PN sequence code to produce the narrowband signals.

22. A method as in claim 21, wherein the PN sequence code is a fast code sequence $C_f(t)$.

23. A method as in claim 18, wherein the frequency offsetting is provided by mixing the spread spectrum signals with frequency signals $F_1 \ldots F_n$, respectively.

24. A method as in claim 19, further comprising removing the frequency offset after processing in the receiver.

25. A method as in claim 24, wherein removing the frequency offset includes mixing the receiver output in a plurality of mixers $MR_1 \ldots MR_n$ with frequency signals $F_1 \ldots F_n$, respectively.

26. A method as in claim 19, wherein the spread spectrum signal includes a PN fast code signal $C_f(t)$, and said method further includes error tracking the PN fast code alignment.

27. A method as in claim 26, wherein the error tracking includes multiplying the spread spectrum signals in the composite broadband signal by a despreading error function to produce a second composite narrowband signal for error tracking the PN fast code.

28. A method as in claim 19, wherein the despreading error function is:

$$p(t)[C_f(t+\tau_c) - C_f(t-\tau_c)]$$

where $p(t)$ is a perturbational sequence and $\tau_c$ is the chip time.

29. A method as in claim 27 or 28, wherein the error tracking further includes demodulating the receiver output to generate a misalignment PN error signal based on the despreading error function.

30. A method as in claim 18, wherein the spread spectrum signals includes a PN slow coding sequence $C_s(t)$ for beam steering.

31. A method as in claim 30, wherein the PN slow coding sequence has a frequency of at least twice the frequency of a data rate of the spread spectrum signals.

32. A method as in claim 18, wherein the spread spectrum signal includes a chirp signal, and the despreading signal includes a dechirp signal.

* * * * *